United States Patent [19]
Taddei

[11] Patent Number: 6,047,650
[45] Date of Patent: Apr. 11, 2000

[54] METHOD AND KIT FOR APPLICATION OF LAWN CARE PRODUCTS

[76] Inventor: Anthony M. Taddei, Ramsey Rd., Yardley, Pa. 19067

[21] Appl. No.: 09/335,671

[22] Filed: Jun. 18, 1999

[51] Int. Cl.[7] .............................. A01C 21/00; A01B 1/00
[52] U.S. Cl. ................................ 111/92; 111/99; 111/200; 111/900
[58] Field of Search ............................ 111/100–104, 106, 111/107, 114–117, 89, 92, 98, 99, 200, 900

[56] References Cited

U.S. PATENT DOCUMENTS

| | | | |
|---|---|---|---|
| 3,122,110 | 2/1964 | Wernicke | 111/4 |
| 3,290,821 | 12/1966 | Parry | 47/48.5 |
| 4,694,760 | 9/1987 | Camp | 111/92 |
| 5,257,666 | 11/1993 | Townsend, Jr. | 172/378 |
| 5,716,132 | 2/1998 | Chou | 366/129 |

*Primary Examiner*—Christopher J. Novosad
*Attorney, Agent, or Firm*—Henderson & Sturm LLP

[57] ABSTRACT

A method and apparatus 10 for restoring the pH balance of a patch of contaminated hyper acidic soil 100 by creating a series of core holes 101 in the contaminated soil 100 with a core removal tool 20 having a hollow stem element 21 to captively engage a plug of contaminated soil 100 and then refilling the core holes 101 with a substitute soil compound 14 including a mixture of pH balanced soil 50 and a plurality of biodegradable capsules 51 containing a mixture of water and nitrate ions.

14 Claims, 1 Drawing Sheet

METHOD AND KIT FOR APPLICATION OF LAWN CARE PRODUCTS

BACKGROUND OF THE INVENTION

1. Field of the Invention

The present invention relates to the field of lawn care systems in general and in particular to a method and apparatus for treating brown spots on a lawn by re-establishing a balanced soil pH.

2. Description of Related Art

As can be seen by reference to the following U.S. Pat. Nos. 5,257,666; 5,716,132; 4,694,760; 3,122,110; and 3,290,821, the prior art is replete with myriad and diverse ground penetrating agricultural tools used for planting and the like.

While all of the aforementioned prior art constructions are more than adequate for the basic purpose and function for which they have been specifically designed, they are uniformly deficient with respect to their failure to provide a simple, efficient, and practical lawn care system that solves the problem of elimination of brown spots on lawns caused by frequent animal urination at a particular location which raises the acidic content of the soil.

Needless to say most homeowners and lawn care professionals are very concerned about the aesthetic appearance produced by uniform lawn coloration and the presence of unsightly brown spots on an otherwise uniformly green lawn produces a visually jarring effect.

As a consequence of the foregoing situation, there has existed a longstanding need for a new and improved method and apparatus for eliminating brown spots on a lawn by pH soil balancing and the provision of such a system is the stated objective of the present invention.

BRIEF SUMMARY OF THE INVENTION

Briefly stated, the soil balancing system that forms the basis of the present invention comprises in general a method of applying a specialized lawn care product to a patch of hyper acidic soil by selectively removing cylindrical core samples using a coring tool followed by replacement of the removed core sample using a specially contoured shovel to dispense a mixture of soil having an encapsulated weak base compound which will slowly disassociate to restore the pH balance of the surrounding soil.

As will be explained in greater detail further on in the specification, this method contemplates the removal of four core samples per square foot of hyper acidic soil wherein each core sample is approximately six cubic inches in volume, widely distributing the core samples at a remote location from the problem patches and filling the core holes with a mixture; a fresh soil having biodegradable capsules containing a mixture of nitrate ions and water to create a soil having a weak base that will counteract the hyper acidic soil surrounding the core holes to restore the pH balance of the soil in the affected area and cause the grass growing in the problem area to once again have a healthy green appearance.

In the preferred embodiment of the invention, the preferred mixture within the capsules will be 1 mole N03-ion to 10 moles of water; wherein, the volume content of biodegradable capsules to fresh soil will be dependent upon the level of urination and/or defecation activity that takes place at a given location.

For example, a condominium complex with a large number of pets which relieve themselves in the same general area would produce the highest concentrations of hyper acidic soil. A home having two or more large dogs would represent an intermediate concentration of hyper acidic soil and the lowest concentration of hyper acidic soil would be found on a lawn frequented by a single small dog or a limited number of small birds nests.

Again, in the preferred embodiment of this invention, it is contemplated that the individual capsules should have a weight of 5 grams and the suggested concentration of capsules per volume of soil to treat different concentrations of hyper acidic soil should be 50 capsules per 10 lbs. of soil for the highest hyper acidic conditions; 25 capsules per 10 lbs. of soil for intermediate hyper acidic conditions and 15 capsules per 10 lbs. of soil for the weakest hyper acidic conditions.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
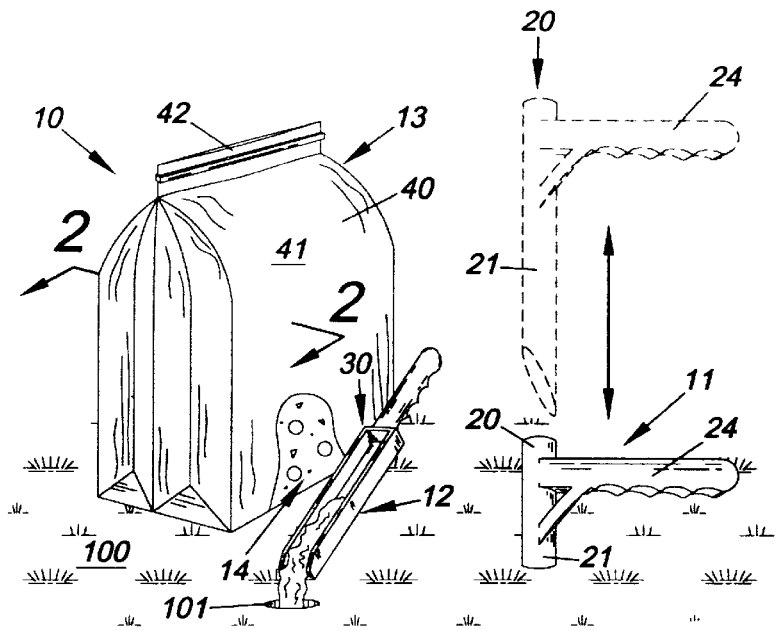
FIG. 1 is a perspective view of the apparatus that is employed in conjunction with the method of this invention.

As can be seen by reference to the drawings, and in particular to FIG. 1, the apparatus that is employed in the method that forms the basis of the present invention are designated generally by the reference number 10. The apparatus 10 includes in general a core removal unit 11 a core replacement unit 12 a receptacle unit 13 and a substitute soil compound 14. These units will now be described in seriatim fashion.

Figure 4:
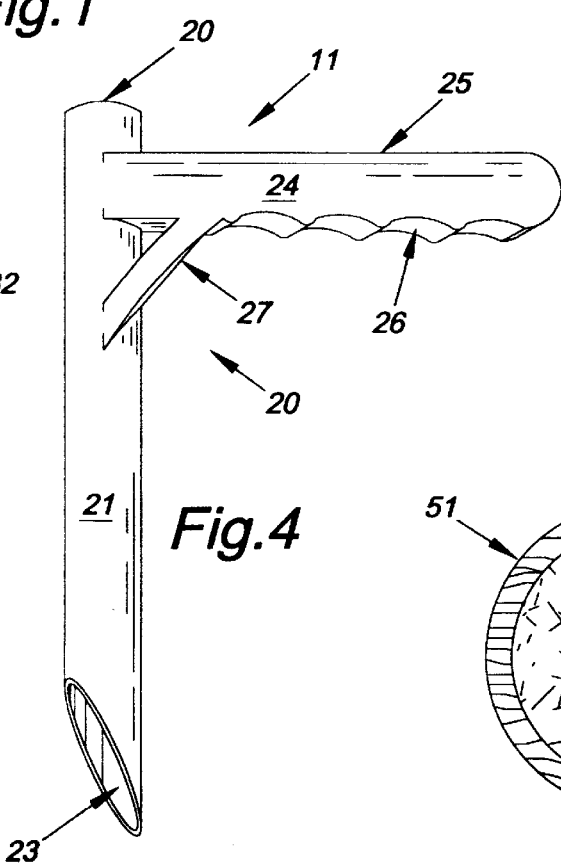
FIG. 4 is a perspective view of the core sample removal tool.

As shown in FIGS. 1 and 4, the core removal unit 11 comprises a core removal member 20 including a hollow cylindrical stem element 21 having a closed upper end 22 an angled open lower end 23 designed to penetrate the soil 100 and captively engage a cylindrical plug of contaminated hyper-acidic soil 100.

In addition, the upper portion of the stem element is provided with an outwardly extending arm element 24 having a flat upper surface 25 dimensioned to form a foot rest for forcing the stem element 21 into the soil and having a contoured lower surface 26 on the lower end to provide a hand grip for removing the stem element 21 containing the contaminated soil plug from the core hole 107 created in the soil 100 by the core removal unit 11.

As can also be seen by reference to FIGS. 1 and 4, the in-board end of the outwardly extending arm element 24 may further be provided with an angled brace arm 27 which is connected to the stem element 21 to provide additional structural rigidity to the core removal member 20.

Figure 3:
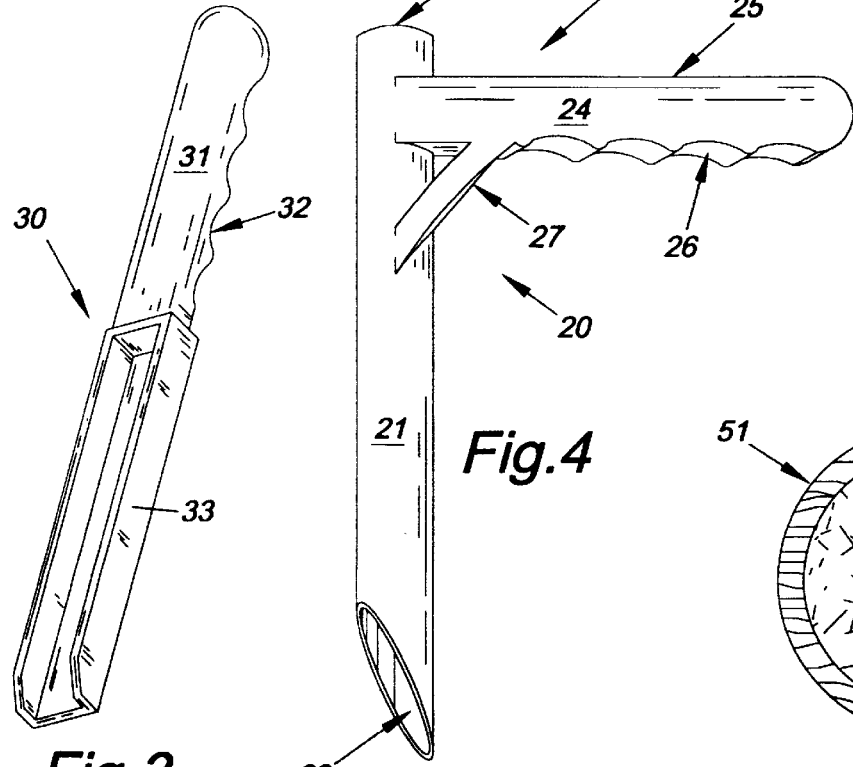
FIG. 3 is a perspective view of the specialized shovel used to deposit the soil buffering composition in the core holes.

Turning now to FIGS. 1 and 3, it can be seen that the core replacement unit 12 comprises an elongated relatively small shovel member 30 having an upper handle element 31 provided with a contoured grip surface 32 and a lower relatively narrow shallow depth three-sided scoop element 33 dimensioned to be received in the core hole 101 as will be explained in greater detail further on in the specification.

As can best be seen by reference to FIGS. 1 and 2, the receptacle unit 13 comprises a waterproof receptacle member 40 having generally flexible walls 41 and a resealable closure element 42 provided on its upper end; wherein, the receptacle member 40 is dimensioned to receive a quantity of substitute soil compound 14 whose composition will be described next.

Figure 2:
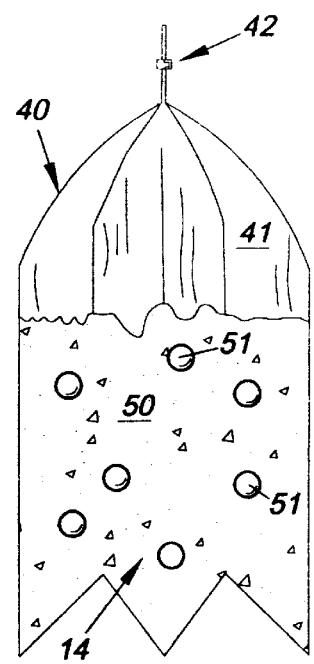
FIG. 2 is a partial cross-sectional view of the resealable bag that contains the soil buffering composition of the invention.

As shown in FIGS. 1 and 2, the substitute soil compound 14 comprises a mixture of pH balanced soil 50 and biodegradable capsules 51 whose relative proportions are varied according to the hyper acidic soil contamination concentration that the substitute soil compound 14 is intended to counteract.

Figure 5:
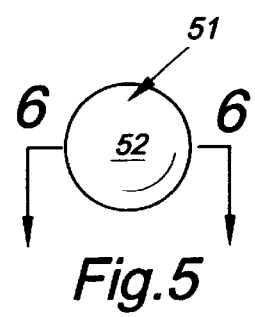
FIG. 5 is a perspective view of one of the biodegradable capsules.
Figure 6:
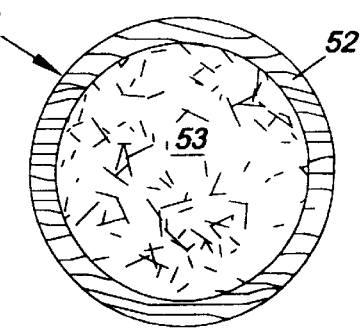
FIG. 6 is a cross-sectional view taken through line 6—6 of FIG. 5.

Turning now to FIGS. 5 and 6, it can be seen that each of the capsules 51 comprises an outer biodegradable covering 52 which encapsulates a mixture 53 of water and nitrate ions at a ratio of 10:1.

The method that is employed with the apparatus 10 involves forcing the core removal unit 11 into the ground by stepping on the upper surface 25 of the arm element 24 to force the stem element 21 into penetrating engagement with the soil 101 to captively engage a plug of contaminated soil 100. The user would then grasp the underside 26 of the arm element 24 to remove the stem element 21 and the plug of contaminated soil to expose the core hole 101.

At this point, the user would open the receptacle member 40 and remove a quantity of the substitute soil compound 14 with shovel member 30 which would subsequently be employed to refill the core hole 101 with the substitute soil compound 14 to a desired density and compactness.

Once the core hole 101 has been refilled, the coverings 52 of the biodegradable capsules 51 will eventually rupture to release the mixture 53 of water and nitrate ions into the pH balanced soil 50 wherein a chemical buffering effect will be transferred to the surrounding hyperacide soil 100 to restore the pH balance surrounding the individual core holes 101.

Then prior to the creation of the next core hole 101 the contaminated soil plug will be removed from the stem element 21 of the core removal tool 20 before the process can be repeated.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A kit for restoring pH balance to a patch of acidic soil; wherein, the kit comprises;
    a core removal member having a hollow stem element for removing a plug of contaminated soil from the patch of hyper acidic soil and simultaneously creating a core hole;
    a core replacement unit including a shovel member having a scoop element which is dimensioned to be received in said core hole;
    a receptacle unit including a receptacle member having a sealable closure and dimensioned to receive a quantity of material;
    a quantity of substitute soil compound disposed within the receptacle member.

2. The kit as in claim 1; wherein, the core removal member further includes;
    an arm element projecting outwardly from the hollow stem element wherein the arm element has an upper surface which provides a foot rest for providing a downwardly directed force to the stem element.

3. The kit as in claim 2; wherein, the arm element has a contoured lower surface which provides a gripping surface for removing the stem element from engagement with the soil.

4. The kit as in claim 3; wherein, the hollow stem element has an upper end and lower end wherein the upper end of the hollow stem element is closed and the lower end of the hollow stem element has an angled opening.

5. The kit as in claim 4; wherein, the core removal member is further provided with a brace arm which extends between the arm element and the stem element.

6. The kit as in claim 4; wherein, the scoope element of the shovel member has three sides.

7. The kit as in claim 4; wherein, the substitute soil compound comprises:
    a mixture of pH balanced soil and a plurality of biodegradable capsules.

8. The kit as in claim 7; wherein, each of the capsules have a biodegradable covering.

9. The kit as in claim 8; wherein, the biodegradable covering encapsulates a mixture of water and nitrate ions.

10. The kit as in claim 9; wherein, the mixture of water and nitrate ions is at a ratio of approximately 10:1.

11. A method of restoring the pH balance of a patch of acidic soil comprising the steps of:
    (a) removing at least one plug of contaminated soil from the patch of hyper acidic soil to create a core hole;
    (b) replacing the at least one plug of contaminated soil with a quantity of substitute soil compound which is introduced into said core hole.

12. The method as in claim 11 wherein the substitute soil compound comprises;
    a mixture of pH balanced soil and a plurality of biodegradable capsules.

13. The method as in claim 12; wherein, the capsules include a biodegradable covering which encapsulates mixture of water and nitrate ions.

14. The method as in claim 13; wherein, the mixture of water and nitrate ions is at a ratio of approximately 10:1.

* * * * *